Feb. 14, 1961
S. A. MURAWSKI
2,971,285
ARTIFICIAL CASTING BAIT
Filed March 31, 1959
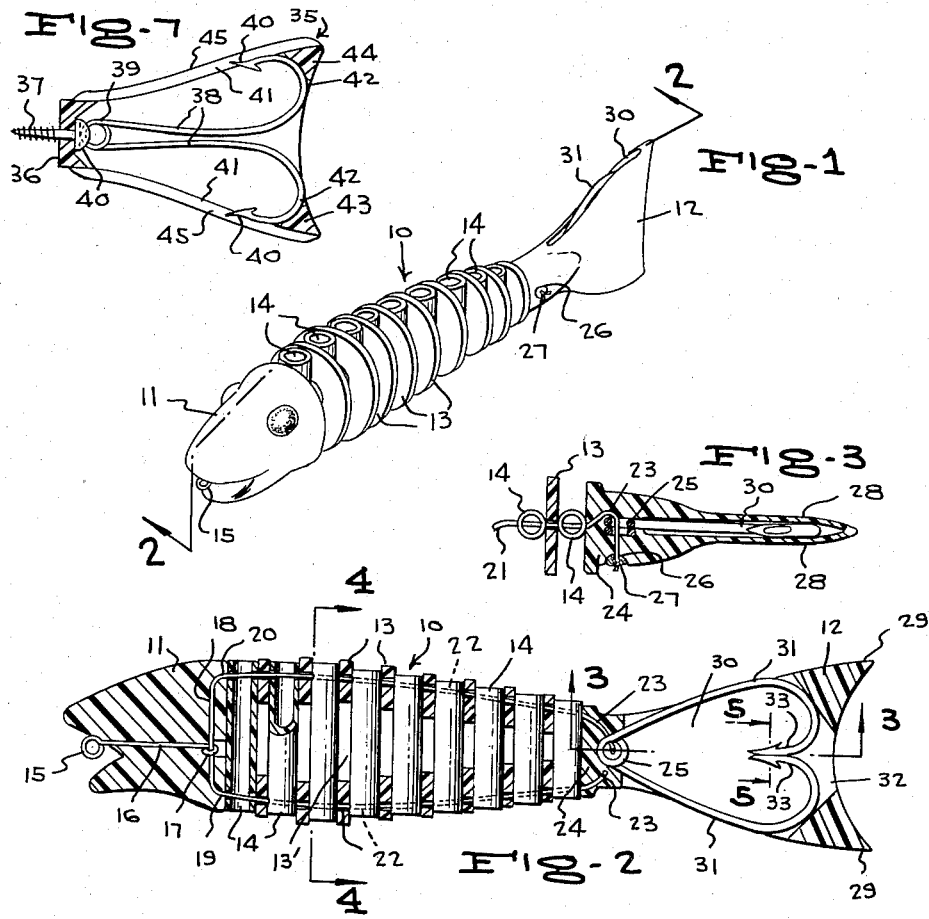
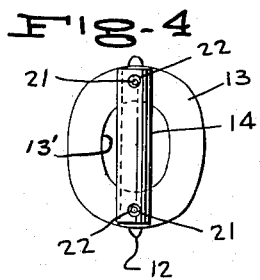
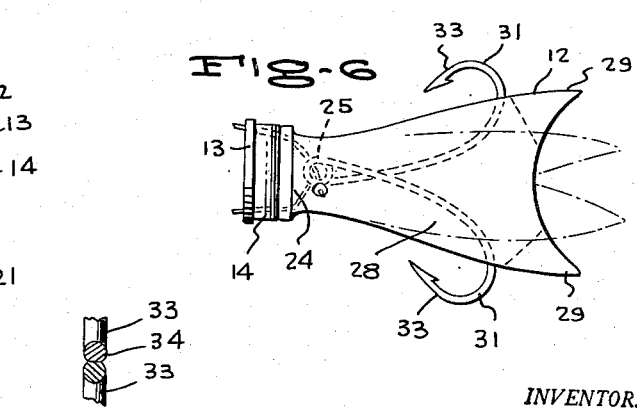
INVENTOR.
STEPHEN A. MURAWSKI
BY
Christian R. Nielsen
ATTORNEY

United States Patent Office 2,971,285
Patented Feb. 14, 1961

2,971,285
ARTIFICIAL CASTING BAIT
Stephen A. Murawski, 13422 Ave. K, Chicago 33, Ill.

Filed Mar. 31, 1959, Ser. No. 803,274

2 Claims. (Cl. 43—35)

This invention relates to an artificial casting bait and it consists in a new and novel assembly of elements in the provision of an articulated bait which will provide motions calculated to lure fish to strike, and it consists in the constructions, arrangements and combinations herein described and claimed.

It is the cardinal object of the invention to provide a casting bait wherein a head member and a tail member are interconnected with a series of disk members and interposed bearing members by flexible strand members whereby when the bait is drawn through the water, in the act of fishing, the lure will partake of motions simulating that of a live minnow.

More specifically, it is an object of the invention to provide an artificial casting bait which comprises a head member and a tail member having a plurality of oval shaped plastic disks of graduated diameters which reduce in the direction of the tail portion, there being a hollow cylindrical plastic tube interposed between opposed pairs of disks forming bearing surfaces between the disks, the disks and tubes being held in assembled relation by means of a strand of stainless steel wire threaded through upper and lower aligned apertures formed in the disks and tubes, said strand being also secured to the tail portion, the latter mounting a dual spring actuated hook concealed within a slot formed in the tail portion.

Additional objects, advantages and features of invention will be apparent from the following description, considered in conjunction with the accompanying drawing, wherein, Figure 1 is a perspective view of the bait constructed in accordance with the invention, Figure 2 is a longitudinal section taken on the line 2—2 of Figure 1.

Figure 3 is a section taken on the line 3—3 of Figure 2.

Figure 4 is a cross section taken on the line 4—4 of Figure 2.

Figure 5 is an enlarged cross section on the line 5—5 of Figure 2, and

Figure 6 is a side elevation of the tail portion of the bait, illustrating the hooks in sprung position, after collapse of the tail portion, as would occur when the bait is struck by a fish.

Figure 7 is a longitudinal sectional view of a modified construction of the tail section of the bait.

In Figures 1 and 2 of the drawing, a casting bait, generally indicated by the reference character 10 is shown, which comprises a head member 11, a tail portion 12 and a plurality of disks 13 and interposed hollow tubes 14, flexibly interconnected between the head and tail portions, as will now be described, attention being particularly invited to Figure 2 of the drawing.

Obviously, the bait may be constructed in various sizes and shapes and from various materials, but in the present instance, the head, disks, tubes and tail member are formed from plastic materials, in various colors or variations thereof. As here shown, the head 11 is of general ovate form in cross section, and the disks 13 are of a corresponding shape, but being of reduced diameters in the direction of the tail portion 12, so as to conform to the shape of a live minnow.

As clearly shown in Figure 2, the head member 11 is formed with a line attaching eye 15 which is an integral part of a shank 16 which is embedded in the head member, the shank also comprising an inner eyelet 17. The head member further includes a bore 18 which extends at right angles to the eyelet 17 which bore terminates in respective lower and upper horizontal bores 19 and 20 through which, and the eyelet 17, a stainless steel wire 21 is threaded, the wire also flexibly mounting the disks 13 and hollow tubes 14, as will now be described.

As previously stated, the disks and tubes are of graduated diameters and lengths, reducing in the direction of the tail portion 12, and preferably a tube 14 will be in abutting relation with the head portion and the tail portion, the tubes and disks being alternately assembled upon the wire by threading the wire through aligned openings 22 formed through the disks and tubes. The wire 21 is also threaded through openings 23 provided in the base member 24 of the tail portion, which wire also passes through a helix 25 of a dual hook, as will be presently described. The terminal ends of the wire are twisted together and soldered and housed in a depression 26 formed in the outer surface of the base 24 of the tail portion. The secured ends of the wire 21 may be concealed within the recess 26 by an application of plastic solder 27, thus providing a smooth continuous surface.

The tail member 12 is formed by the use of a pair of thin plastic side walls 28 which have a contour similar to that of a natural fish tail, the outer upper and lower ends 29 of which are cemented or otherwise secured together. There is thus provided a vertically positioned passage 30 for housing a pair of hooks 31 which are integral with respective terminal helices of the helix 25. It will also be noted that the passage 30 is in communication with an opening 32 formed in the tail 12. The construction of the helix 25 is such as to tension the hooks 31 for movement in opposite directions, and for maintaining the hooks in a set position, as shown in Figure 2, the outer faces of the barbed ends 33 of the hooks are formed with cooperating flat faces 34 to form contacting surfaces for retaining the hooks in set positions, yet readily releasable, as will be described.

In Figure 7, a modified form of tail construction is shown, in which the tail 35 and attaching base 36 are molded as a unit, the base 36 having a screw 37 mounted therein, the threaded portion projecting therefrom so that the tail may be readily attached to the main body of the bait. This construction permits ready interchanging of tail members of different sizes upon the present bait as well as upon many of the well known lures and bait at present available upon the market.

As shown, the hooks 38 are integrally formed with the helical coil spring 39, a portion of the periphery of which is swaged in the head 40 of the screw for retention of the hooks. In the present instance, the pointed barbed end 40 of the hooks 39 when in set position are disposed in respective slots 41 formed in upper and lower portions of the tail, the bight portions 42 of the hooks having frictional contacting engagement with inclined faces 43 formed by the cementing or molded portions 44 of the side walls of the tail. Thus, when the tail portion 35 is collapsed, when struck by a fish, the inclined faces 43 will release contact upon the hooks, which are then free to spring outwardly through respective slots 41 to penetrate the mouth of the fish.

The tail portion 35 as well as the body of the bait may be provided with thin flexible strips 45, which when in use will waver or shimmer so as to simulate a minnow in swimming motions.

In use of the bait, a fishing line (not shown) will be attached to the eyelet 15 of the shank 16, which it will be noted is positioned horizontally of the head member 11, but at a level below the medial horizontal axis of the bait. Thus, a pull upon the line will tend to produce a diving action to the bait, and under such action of the bait water will be caused to pass upwardly or downwardly through the tubes 14, causing a disturbance of water in and about the bait, which in addition to the wiggling or wobbling action between the disks and tubes, due to the articulated assembly, will simulate the motion of a real fish attempting to escape capture. Also, due to the passage of water through the passage 30 from top to bottom thereof, as well as through the rear opening 32 of the tail, a shimmering motion will be imparted to the side portions 28 of the tail of the bait.

Upon receiving a strike, which would occur at the tail portion 12, the walls 28 will collapse, as indicated in dotted lines in Figure 6, the force of the strike producing a lateral movement of the hooks 33, releasing the hooks from set position to assume the operative catching position shown in Figure 6.

While I have shown and described a preferred form of the invention, this is by way of illustration only, and I consider as my own all such modifications in construction as fairly fall within the scope of the appended claims.

I claim:

1. In a fishing lure including a tail member, said tail member comprising a base member having a threaded shank for securement to the body portion of a lure, said tail member being defined by a pair of flexible wall members, the upper and lower terminal ends of the wall members being secured together to provide a longitudinal passage between the wall members and forming a rear opening, the inner portions of the attached upper and lower ends of the tail member having a face inclined in the direction of said longitudinal passage, a dual spring tensioned hook secured to said threaded shank and positioned within the longitudinal passage, the bight portion of the hooks having frictional contacting engagement with respective inclined faces for retaining the hooks in set position within the passage.

2. In a fishing lure including a tail member, said tail member comprising a base member having means for securement to the body portion of a lure, said tail member being defined by a pair of flexible wall members, the upper and lower terminal ends of the wall members being secured together to provide a longitudinal passage between the wall members and forming a rear opening, the inner portions of the attached upper and lower ends of the tail member having a face inclined in the direction of said longitudinal passage, the bight portion of the hooks having frictional contacting engagement with respective inclined faces for retaining the hooks in set position within the passage.

References Cited in the file of this patent

FOREIGN PATENTS

| | | |
|---|---|---|
| 30,172 | Sweden | Jan. 21, 1911 |
| 148,351 | Sweden | Jan. 4, 1955 |
| 198,571 | Great Britain | June 7, 1923 |
| 1,021,228 | France | Nov. 26, 1952 |